INVENTOR.
JOHN J. LENTZ
BY Elmer W. Galbi
ATTORNEY

April 20, 1965 J. J. LENTZ 3,179,815

CRYOGENIC CIRCUITRY

Filed June 13, 1962 7 Sheets-Sheet 3

April 20, 1965 J. J. LENTZ 3,179,815

CRYOGENIC CIRCUITRY

Filed June 13, 1962 7 Sheets-Sheet 4

April 20, 1965 J. J. LENTZ 3,179,815

CRYOGENIC CIRCUITRY

Filed June 13, 1962 7 Sheets-Sheet 5

April 20, 1965 J. J. LENTZ 3,179,815

CRYOGENIC CIRCUITRY

Filed June 13, 1962 7 Sheets-Sheet 7

United States Patent Office 3,179,815
Patented Apr. 20, 1965

3,179,815
CRYOGENIC CIRCUITRY

John J. Lentz, Chappaqua, N.Y., assignor to International Business Machines Corporation, New York, N.Y., a corporation of New York Filed June 13, 1962, Ser. No. 206,537
14 Claims. (Cl. 307—88.5)

This invention relates to electrical circuitry and more particularly to high speed superconductive circuitry.

Cryogenic circuitry is generally organized in the form of loop circuits each of which has two current paths connected between a current source and a current collecting means. Each current path has a cryotron gate in series therewith which can be made resistive to cause the current to flow in the other current path. An output signal is obtained from each loop circuit by having the control element of an output cryotron connected in series with a current path of the loop circuit. Such loop circuits can be connected in chains between an input loop circuit and an output loop circuit. Each loop circuit in a chain (except the input loop circuit) is activated by the preceding loop circuit and each loop circuit (except, possibly, the output loop circuit) activates a succeeding loop circuit.

The magnitude of the current applied to a loop circuit in combination with the resistance of the gating elements in the loop circuit determines a parameter of the loop circuit called the virtual power level of the loop circuit. If the control elements and gating elements of a loop circuit are of the crossed film type the virtual power level of the loop circuit is equal to the product of one half the resistance of a gating element in the loop circuit times the square of the current supplied to the loop circuit. That is, with crossed film cryotrons the virtual power level of a loop circuit equals $RI^2$ where R is one half the resistance of one of the gating elements in the loop circuit and I is the current supplied to the loop circuit. If the control elements and the gating elements of a loop circuit are of the in-line type, the virtual power level of the loop circuit is equal to the product of one half of the resistance of one of the gating elements in the loop circuit times the magnitude of the current supplied to the loop circuit. That is, with in-line cryotrons the virtual power level of a loop circuit equals RI where R is one half the resistance of one of the gating elements in the loop circuit and I is the current supplied to the loop circuit.

In many instances it is desirable to minimize the time required for a signal to propagate through a chain of loops. One feature of the present invention is a means of minimizing the time required for a signal to propagate through a chain of loop circuits. A signal will propagate through a chain of loop circuits in the shortest possible time if the virtual power level of each of the loop circuits in the chain including the first and the last is identical. The impedance level of the loop circuits in the chain may differ; however, so long as the virtual power level of the loop circuits is the same, a signal will propagate through the chain with a minimum amount of delay.

In certain instances, the virtual power level of two loop circuits, one of which must drive the other, are determined by requirements of other circuitry to which the two loop circuits are connected. Hence, in certain instances a loop circuit which has a particular virtual power level must drive another loop circuit which has a different virtual power level. Another feature of the present invention is the provision of a network which can propagate a pulse from a driving loop which has a certain virtual power level to a receiving loop which has a different virtual power level with a minimum amount of delay.

One object of the present invention is the provision of a cascaded series of loop circuits through which a signal can propagate with a minimum amount of delay.

Another object of the present invention is the provision of a cascaded series of loop circuits with various impedance levels, through which a signal can be propagated with a minimum amount of delay.

Another object of the present invention is to provide a network which minimizes the time required for a pulse to propagate from a driving loop which has a certain virtual power level to an output loop circuit which has a different virtual power level.

A further object of the present invention is to provide a circuit in accordance with the above object which has an optimum number of stages.

Another object of the present invention is to provide circuitry which minimizes the time delay experienced by a signal as it is propagated from one loop circuit to another loop circuit.

A further object of the present invention is to provide an amplifying chain between a driving loop which has one virtual power level and a receiving loop which has a different virtual power level which minimizes the delay caused by the fact that the driving loop and the receiving loop have different virtual power levels.

Another object of the present invention is to interpose the correct number of stages between a driving loop and a receiving loop so that signals are propagated from the driving loop to the receiving loop in the shortest possible time.

Yet another object of the present invention is to provide circuitry in accordance with the foregoing objects which can be easily and reliably fabricated in thin film form.

Another object of the present invention is to provide circuitry in accordance with the foregoing objects which provides a simple, compact and efficient layout.

The foregoing and other objects, features and advantages of the invention will be apparent from the following more particular description of preferred embodiments of the invention, as illustrated in the accompanying drawings.

FIGURE 1 is an overall schematic diagram of a first preferred embodiment.

FIGURES 2*a*, 2*b* and 2*c* (which fit together as shown in FIGURE 2) are a layout diagram of the physical structure of the first embodiment.

Figure 1:
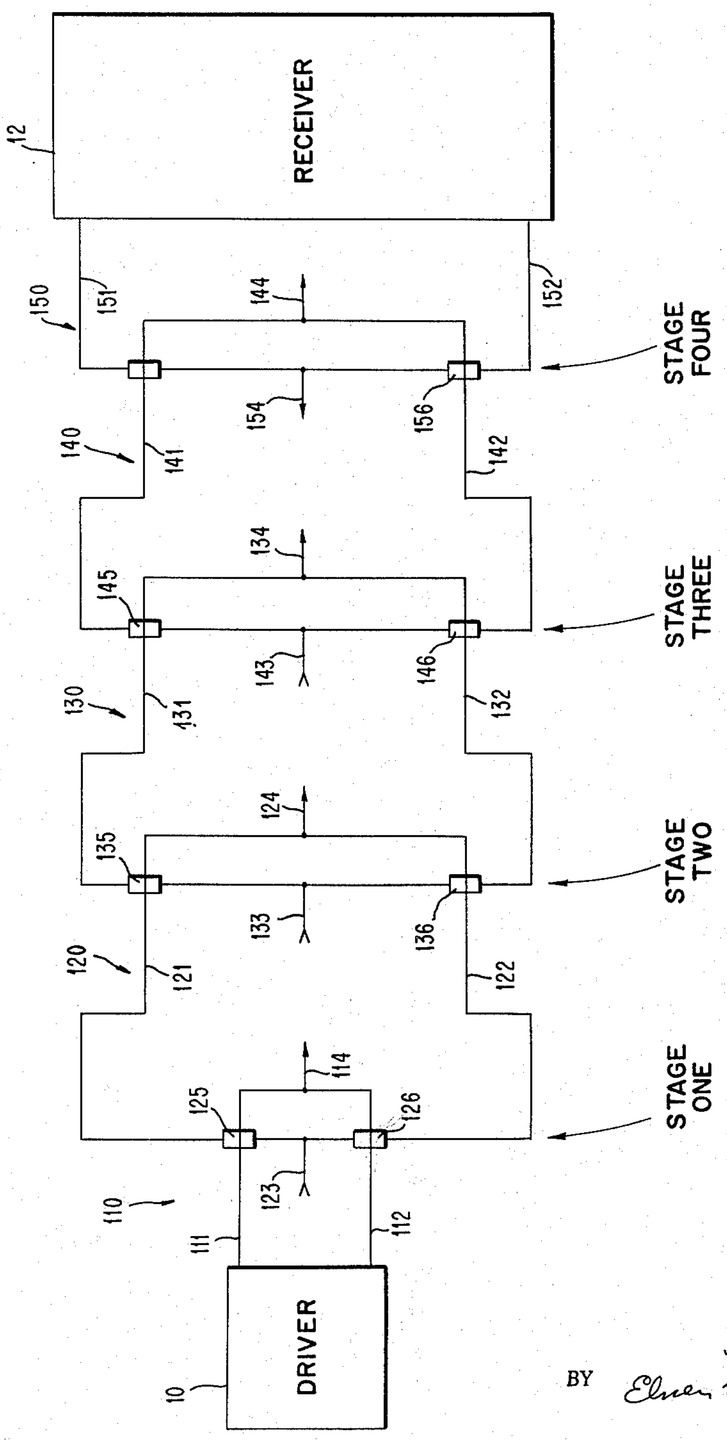
Figure 2A:
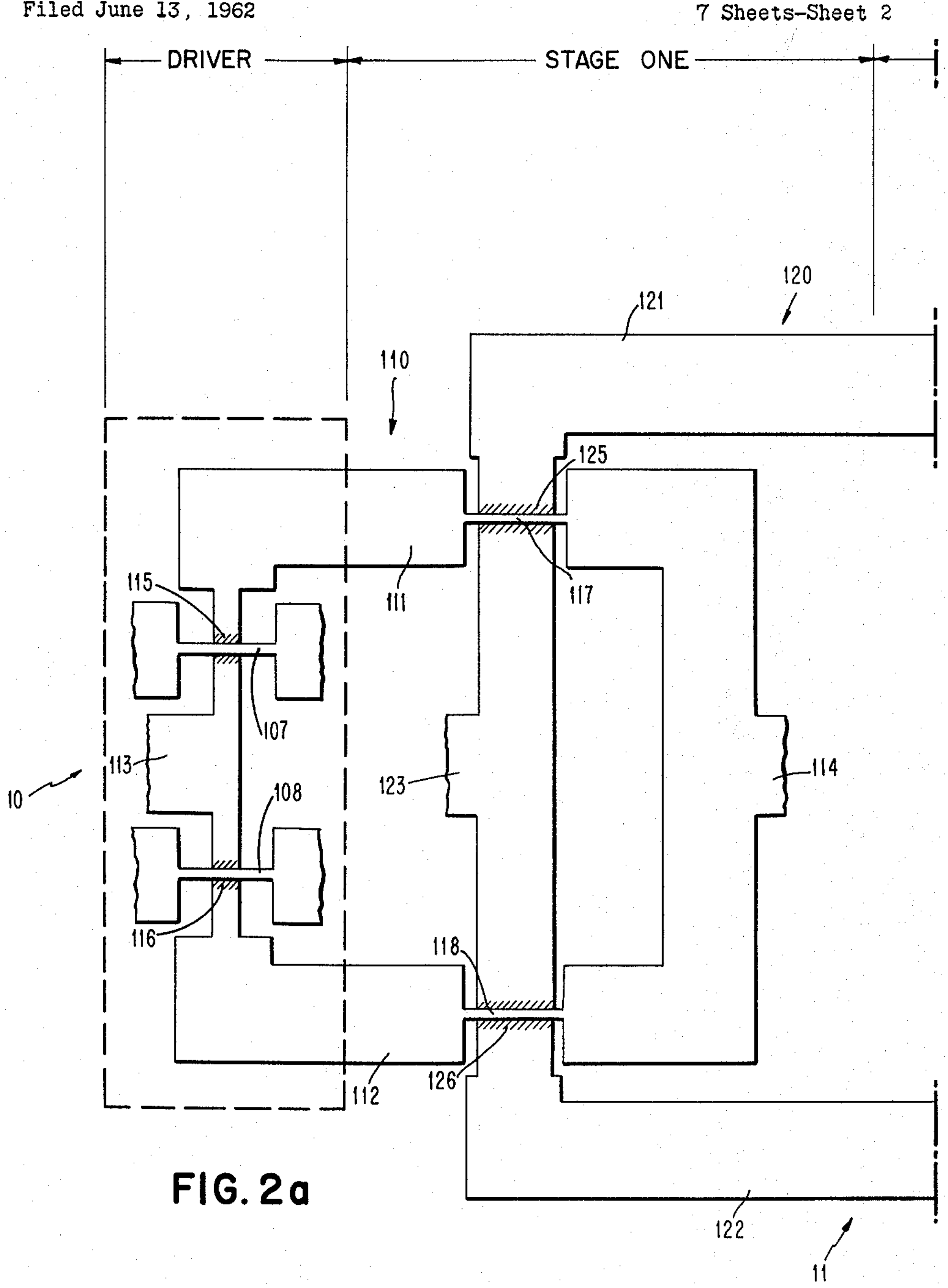
Figure 2:
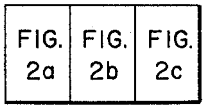
Figure 2B:
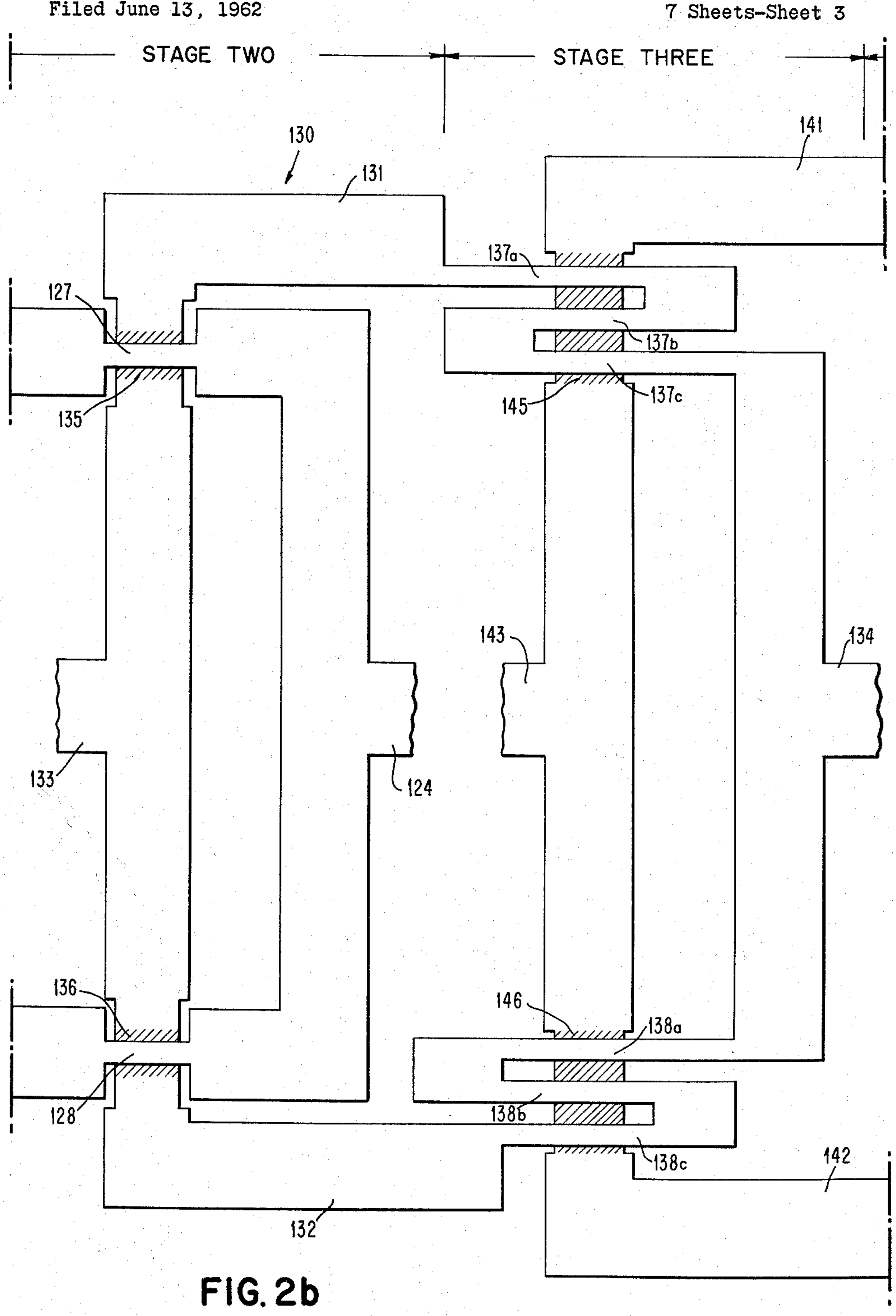
Figure 2C:
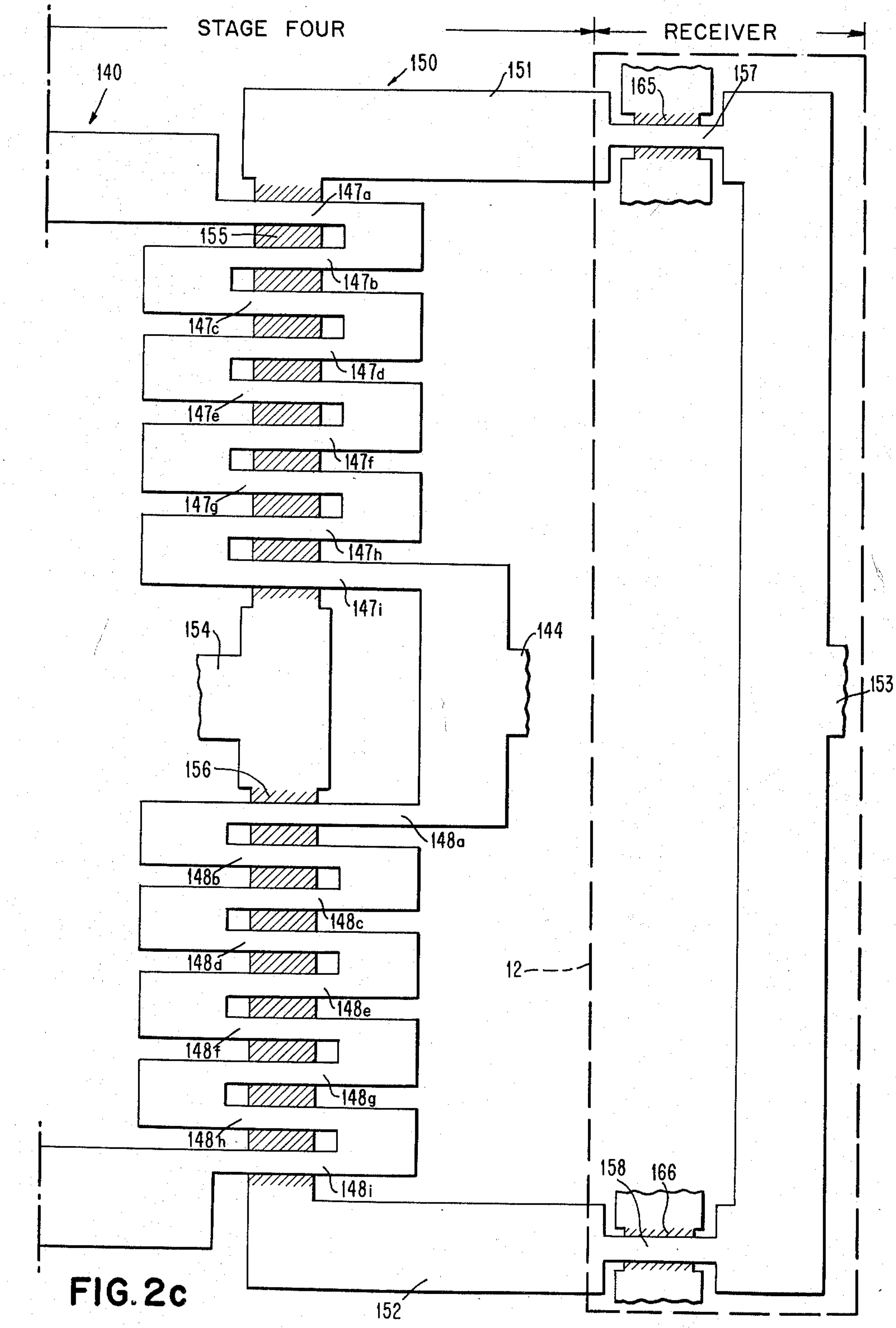

The first preferred embodiment of the present invention is shown in schematic form in FIGURE 1. The actual physical structure of the circuitry is shown in FIGURES 2*a*, 2*b* and 2*c* (which fit together as shown in FIGURE 2). This first embodiment includes a driver 10 which has an output loop circuit 110 and a receiver 12 which has an input loop circuit 150. The virtual power level of loop 110 is ONE and the virtual power level of loop circuit 150 is EIGHTY-ONE. The characteristics of driver 10 and of receiver 12 including the virtual power level of loop circuits 110 and 150 is established by external considerations. Loop circuits 110 and 150 are interconnected by three loop circuits 120, 130 and 140. Loop circuit 110 controls loop circuit 120, loop circuit 120 controls loop circuit 130, loop circuit 130 controls loop circuit 140 and loop circuit 140 controls loop circuit 150.

The function of loop circuits 120, 130 and 140 is to provide means for transmitting a signal from driver 10 to receiver 12 in the shortest possible time. As previously stated a signal will propagate through a chain of loop circuits in the shortest possible time if the virtual power level of each of the loop circuits is equal. If the current paths of loop 110 were connected directly in series with the control elements of the cryotrons in loop 150 a signal will not propagate from driver 10 to receiver 12 in the shortest time because the virtual power level of the two loops is not equal. Hence, the interconnecting network which includes loops 120, 130 and 140 is needed.

Each loop circuit includes two current paths connected between a current source and a current collecting means. For example, loop circuit 120 includes current paths 121 and 122 connected between current source 123 and current collecting means 124. Current path 121 has a gating element 125 and the control element for gating element 135 connected in series therewith and current path 122 has a gating element 126 and the control element for gating element 136 connected in series therewith. The control element for gating element 125 is connected in series with current path 111 and the control element for gating element 126 is connected in series with current path 112.

When current is flowing in current path 111, gating element 125 is resistive and hence the current from current source 123 flows in current path 122; and when current is flowing in current path 112, gating element 126 is resistive and hence, the current from current source 123 flows in current path 121. When the state of loop circuit 110 is changed by driver 10 (i.e., when current is switched from path 111 to 112 or vice versa) the state of loop circuit 120 is changed. Thus a signal is propagated from loop circuit 110 to loop circuit 120. Each of the other loop circuits is similar to loop circuit 120, and signals are propagated between the other loop circuits in the same manner as explained above relative to loop circuits 110 and 120.

In order to facilitate reference between the specifications and the drawings, a uniform number scheme is used. A three digit numeral is used to designate each component in each loop circuit. The TENS digit of the numeral used to designate each element in any loop circuit is the same. The last numeral in the designation of any element is the same for each of the corresponding elements in each loop circuit. For example, the current paths in loop circuit 120 are designated 121 and 122 and the corresponding current paths in loop circuit 130 are designated 131 and 132. As shown in FIGURES 2*b* and 2*c*, which show the physical structure of the circuitry, certain of the control lines traverse the associated gates more than once. For example, as shown in FIGURE 2*b*, gating element 145 is traversed three times by the associated control element. For clarity of illustration, in FIGURE 1 each control element is shown crossing the associated gate only once. In FIGURES 2*a*, 2*b* and 2*c*, the various segments of a control element which traverses a gate a plurality of times are all designated with the same number; however, the numbers are followed by different letters. For example, the control segments which traverse gating element 145 are designated 137*a*, 137*b* and 137*c*. The three segments together are referred to as control element 137. Each junction where one loop circuit drives another loop circuit is hereinafter called a stage. Hence, the circuit shown in FIGURES 1 and 2 has four stages.

One feature of the present invention is the interpositions of the correct number of loop circuits (i.e., the correct number of stages) between driver 10 and receiver 12 which have different virtual power levels so that signals will propagate from driver 10 to receiver 12 in the shortest possible time. The optimum number of stages which should be interposed between driver 10 and receiver 12 is equal to the closest integer to the natural logarithm of the virtual power level of loop circuit 150 divided by the virtual power level of loop circuit 110. That is: if $$n=\ln\frac{VP_{150}}{VP_{110}}$$

where:

$VP_{110}$=the virtual power level of loop 110.
$VP_{150}$=the virtual power level of loop 150.

The optimum number of stages is given by the integer nearest $n$. Naturally as a matter of engineering practice the integer next lower than $n$ might be chosen. It can easily be seen that if the virtual power level of the driver and the receiver are the same, $n$ is equal to the natural logarithm of one which is zero. Hence, where the virtual power level of the driver and of the receiver is the same no extra stages are needed. That is, where the virtual power level of the driver and the receiver is the same, the current paths of the driver can be connected directly in series with the control lines for the gating elements in the receiver loop if the two loop circuits are otherwise compatible.

In the particular embodiment shown herein the virtual power level of driver 110 is ONE and the virtual power level of receiver 150 is EIGHTY-ONE, therefore $n$ equals the closest integer to the natural logarithm of EIGHTY-ONE. The natural logarithm of EIGHTY-ONE is "4.39," hence, four stages are interposed between driver 10 and receiver 12.

The plurality of stages between driver 10 and receiver 12 must fulfill a further condition in order to propagate signals from driver 10 to receiver 12 in the shortest possible time. This condition is that the time delays introduced by each of the stages between driver 10 and driver 12 must be substantially equal. The manner in which this is accomplished is explained later with reference to the physical structure shown in FIGURES 2*a*, 2*b* and 2*c*.

In the circuitry shown in FIGURES 2*a*, 2*b* and 2*c* each gating element is "3.2" times as wide as the control element in series therewith. That is, each gating element is "3.2" times as wide as the control element in the same current path. The ratio between the width of the gating element in a current path and the width of the control element in the same current path is a significant parameter hereinafter called K. The value of K is established by such considerations as the materials used to fabricate the circuitry, the operating temperatures, and the fabrication techniques. Though K has a value of "3.2" in all the circuitry shown herein, the present invention is not limited to such circuitry. If the present invention is applied to circuits wherein the value of K is a value other than "3.2" the dimensions of each gate element or of each control element would change by an appropriate scale factor.

For convenience in the later description, a current of 2.0 amperes is hereinafter referred to as unit current, a width of "$5.0\times10^{-3}$" centimeters is hereinafter referred to as a unit width and a gating element (*a*) which is "3.2" units wide, (*b*) which has a control element of unit width and (*c*) which is crossed only once by the associated control will hereinafter be referred to as a gating element which introduces two units of resistance into a current path. For convenience (except where otherwise indicated) the magnitude of each width, current and resistance will hereinafter be described with reference to the above unit current, unit width and unit resistance. The thickness of the gating elements, the insulating material, etc., is taken into account in the above units because in the particular embodiments shown herein the circuitry is uniform. That is, all the gating elements have the same thickness, all the insulating material has the same thickness, etc. Naturally, the present invention is not restricted to the particular magnitudes shown in the preferred embodiment described herein and the invention is equally applicable to circuitry wherein other current magnitudes, circuit widths, and resistances are used.

The actual materials from which the circuitry is fabricated and the method of fabrication form no part of the present invention. For example, the gating elements may be made of tin and the circuitry other than the gating elements may be made of lead. As is conventional the circuitry is deposited over a superconducting shield in order to reduce the inductance of the circuitry.

As previously explained, each of the loop circuits 110, 120, 130, 140 and 150 has a current source and a current collecting means (shown in FIGURE 1 by arrows). The current sources and current collecting means are shown in FIGURES 2*a*, 2*b* and 2*c* by stubs of circuitry designated 123, 124, etc. The manner of supplying current to the loop circuits is known and no explanation thereof is given herein. The magnitude of the current supplied to each loop circuit is dependent upon the width of the control elements connected in series with the current paths of the circuit. A control element which is one unit wide requires one unit of current in order to generate enough magnetic field to make the associated gating element resistive. A control element three units wide requires three units of current to make the associated gating element resistive.

The width of each gating element, the width of each control element, and the magnitude of each current supply is tabulated below. The quantities are expressed in the previously explained system of units.

complished if the parameters of the various stages have values so that each of the following fractions is substantially equal to "*e*" (i.e., to the base of the natural logarithm).

$$\text{(A)}\qquad \frac{m_1W_{c2}}{R_0W_{c1}}=\frac{m_2W_{c3}}{m_1W_{c1}}=\frac{m_3W_{c4}}{m_2W_{c2}}=\frac{m_4W_{c5}}{m_3W_{c3}}$$

Where:

$R_0$=one half of the resistance introduced by each gating element in driver 10. For example, half the resistance introduced by gating element 115.

$m_1$=the number of times each control line traverses the associated gating element in stage one. For example, the number of times control 117 traverses gating element 125.

$m_2$=the number of times each control line traverses the associated gating element in stage two. For example, the number of times the control element 127 traverses the gating element 135.

$m_3$=the number of times each control line traverses the associated gating element in stage three. For example, the number of times control element 137 traverses gating element 145.

$m_4$=the number of times each control line traverses the associated gating element in stage four. For example, the number of times control element 147 traverses gating element 155.

$W_{c1}$=the width of each control element in stage one. For example, the width of control element 117.

$W_{c2}$=the width of each control element in stage two. For example, the width of control element 127.

| Designation of current path | Designation of gate element | Width of gate element | Designation of control element | Width of control element | Designation of current source | Magnitude of current source |
|---|---|---|---|---|---|---|
| 111 | 115 | 3.2 | 117 | 1.0 | 113 | 1 |
| 112 | 116 | 3.2 | 118 | 1.0 | 113 | 1 |
| 121 | 125 | 9.6 | 127 | 3.0 | 123 | 3 |
| 122 | 126 | 9.6 | 128 | 3.0 | 123 | 3 |
| 131 | 135 | 9.6 | 137a to 137c | 3.0 | 133 | 3 |
| 132 | 136 | 9.6 | 138a to 138c | 3.0 | 133 | 3 |
| 141 | 145 | 9.6 | 147a to 147i | 3.0 | 143 | 3 |
| 142 | 146 | 9.6 | 148a to 148i | 3.0 | 143 | 3 |
| 151 | 155 | 9.6 | 157 | 3.0 | 153 | 3 |
| 152 | 156 | 9.6 | 158 | 3.0 | 153 | 3 |

It was previously stated, that the characteristics of driver 10 and of receiver 12 are established by external considerations. For purposes of illustration, the driver 10 is shown in FIGURE 2*a* as including a current source 113 which supplies a current of unit magnitude and two gating elements 115 and 116 which are 3.2 units wide. Each of the gating elements 115 and 116 has an associated control line respectively elements 107 and 108. Each gating element is only traversed one time by the associated control line. Hence, in driver 10 the virtual power level, that is, the product of one half the resistance of one of the gating elements by the square of the current in the loop is ONE.

For purposes of illustration, receiver 12 is shown as including current source 153 which supplies three units of current and two gating elements 165 and 166. The control elements 157 and 158 for gating elements 165 and 166 are connected in series with current paths 151 and 152 and they only traverse the respective gating elements once. The width of the control elements 157 and 158 is three units. It should be emphasized that the virtual power level of driver 10 and of receiver 12 is established by external considerations. The virtual power levels of driver 10 may, for example, be established by the requirements of control lines 107 and 108, and the virtual power level of receiver 12 may, for example, be established by the requirements of gating elements 165 and 166.

One of the requirements for minimum total delay is that the delays introduced by each stage must be substantially equal. To an engineering approximation this is ac- $W_{c3}$=the width of each control element in stage three. For example, the width of control element 137*a*.

$W_{c4}$=the width of each control element in stage four. For example, the width of control element 147*a*.

For the general case, where more than four stages are required, the expression can be written as follows:

$$\text{(B)}\qquad \frac{m_1W_{c2}}{R_0W_{c1}}=\frac{m_2W_{c3}}{m_1W_{c1}}=\ .\ .\ .\ =\frac{m_jW_{cr}}{m_{j-1}W_{j-1}}$$

Where:

$j$=the parameters of the last stage.

$j$-1=the parameters of the next to the last stage.

$r$=the parameters of the receiver.

The above expressions essentially require that a number of ratios must be equal to "*e*." The parameters of the circuits are set out below in a format which is arranged so that the necessary ratios can be conveniently tabulated.

| | | | | | | | |
|---|---|---|---|---|---|---|---|
| $m_1$ 1 | $W_{c2}$ 3 | $m_2$ 1 | $W_{c3}$ 3 | $m_3$ 3 | $W_{c4}$ 3 | $m_4$ 9 | $W_{c5}$ 3 |
| 1 $R_0$ | 1 $W_{c1}$ | 1 $m_1$ | 1 $W_{c1}$ | 1 $m_2$ | 3 $W_{c2}$ | 3 $m_3$ | 3 $W_{c3}$ |

Each box in the above chart contains a number plus a designation of what the number represents. From the above chart it is easily seen that in the preferred embodiment shown herein each of the terms in the expresison has a value of three. Hence, a signal is propagated from driver 10 to receiver 12 in substantially the shortest possible time. Note that as a matter of engineering convenience integral values have been assigned to all parameters.

Figure 3:
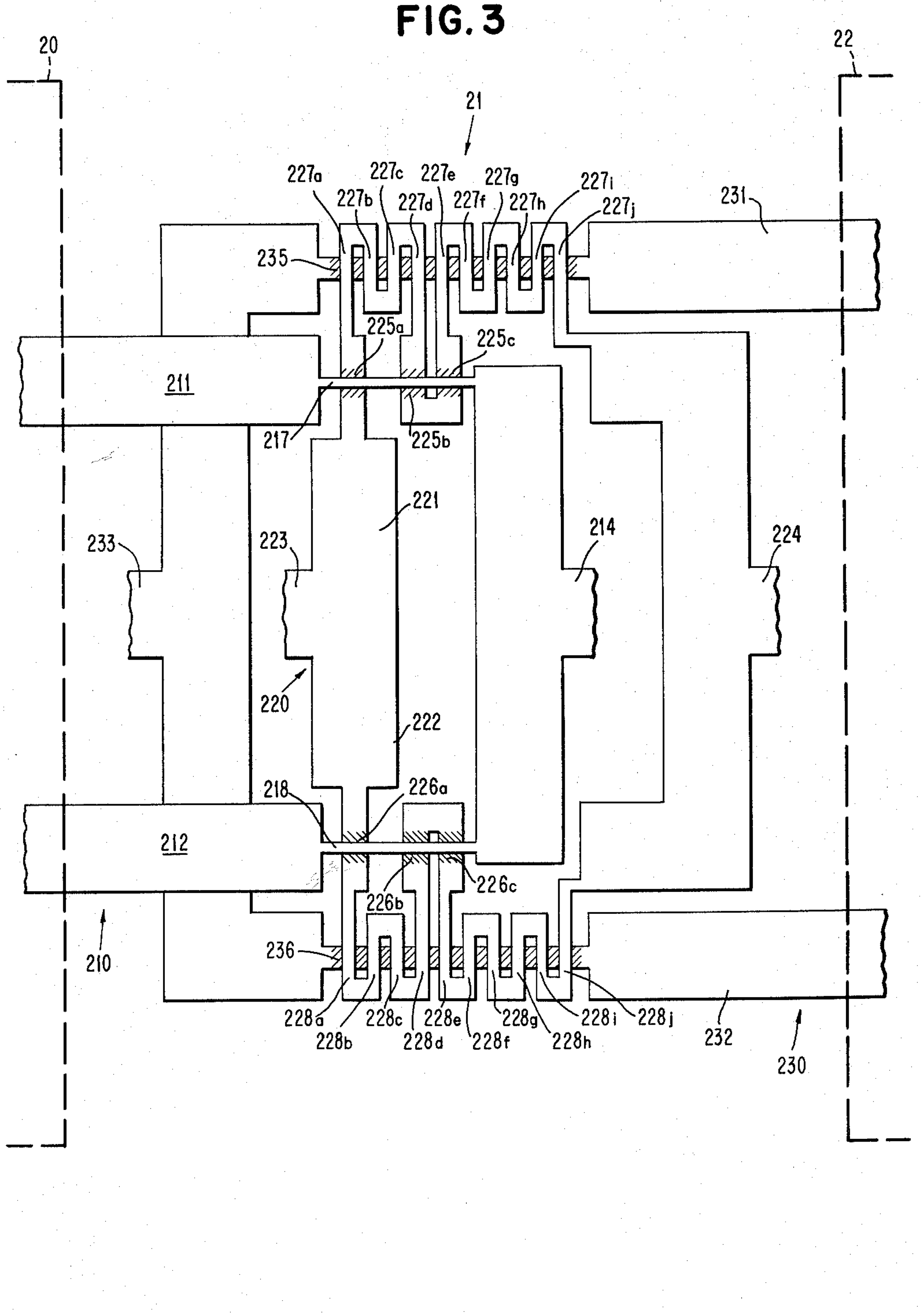
FIGURE 3 is a layout diagram of the physical structure of a second preferred embodiment.

A second preferred embodiment of the invention is shown in FIGURE 3. This alternate embodiment of the invention includes a driver 20 which has a virtual power level of ONE and a receiver 21 which has a virtual power level of TEN. A network 21 is interposed between driver 20 and receiver 22 so that signals will propagate from driver 20 to receiver 22 in the shortest possible time.

As in the previous example, the number of stages in network 21 is equal to the nearest integer of the natural logarithm of the virtual power level of receiver 22 divided by the virtual power level of driver 20. That is, $$n=\ln\frac{VP_{22}}{VP_{20}}$$

where:

$n$=the number of stages (nearest integer).
$VP_{22}$=the virtual power level of receiver 22.
$VP_{20}$=the virtual power level of driver 20.

In terms of the driver 20 and receiver 22, $$n=\ln\frac{10}{1}=2.3$$

current paths 231 and 232 of receiver 22 respectively have gating elements 235 and 236 connected in series therewith.

In each of the circuits shown in FIGURE 2, where a control element traverses a gating element, a plurality of times, the gating element is constructed as one segment and there is no circuitry connected between the places where the control element traversed the gating element at different points. In this embodiment of the invention the gating element in current paths 221 and 222 are divided and between the points where control 217 traverses gate 225, some of the segments of control 227 are connected. That is, segments 227*a*, 227*b* and 227*c* are connected in series between gate segments 225*a* and 225*b*. Likewise the gate segments 225*b* and 225*c* are connected in series between control segments 227*c* and 227*d*. Electrically, the construction shown above is identical to the type of construction shown in FIGURE 2. However, the construction shown above provides a more efficient layout. That is, the circuitry occupies less surface area.

The width of each gating element, the width of each control element and the magnitude of each current supply is tabulated below. The quantities are expressed in the previously explained system of units.

| Designation of current path | Designation of gate element | Width of gate element | Designation of control element | Width of control element | Designation of current source | Magnitude of current source |
|---|---|---|---|---|---|---|
| 211 | Not shown | | 217 | 1.0 | Not shown. | |
| 212 | do | | 218 | 1.0 | | |
| 221 | 225a to 225c | 3.2 | 227a to 227j | 1.0 | 223 | 1 |
| 222 | 226a to 226c | 3.2 | 228a to 228j | 1.0 | 223 | 1 |
| 231 | 235 | 3.2 | Not shown | | 233 | 1 |
| 232 | 236 | 3.2 | do | | 233 | 1 |

The closest integer is two so two stages are interposed between driver 20 and receiver 22.

As in the first embodiment, the number of loop circuits interposed between the driver 20 and receiver 22 is one less than the number of stages. Hence, in the second embodiment only one loop circuit is interposed between driver 10 and receiver 22. The loop circuit at the output of driver 20 is designated 210, the loop circuit which is interposed between driver 20 and receiver 22 is designated 220 and the loop circuit of receiver 22 is designated 230. The two current paths of loop circuit 210 are designated 211 and 212, the two current paths of loop circuit 220 are designated 221 and 222 and the two current paths of loop circuit 230 are designated 231 and 232. Loop circuit 210 has a current collecting means 214, loop circuit 220 has a current source 223 and a current collecting means 224 and loop circuit 230 has a current source 233.

Current paths 221 and 222 of loop circuit 220 each have a gating element and a control element connected in series therewith as did each of the loop circuits shown in FIGURE 1. However, one of the novel features of this second embodiment of the invention is that the gating element connected in series with each of the current paths 221 and 222 is divided into a plurality of segments. The gating element connected in series with current path 221 is in general designated 225 and the three segments thereof are designated 225*a*, 225*b* and 225*c*, and the gating element connected in series with current path 222 is in general designated gating element 226 and the three segments thereof are designated 226*a*, 226*b* and 226*c*. The control element connected in series with current path 221 is in general designated 227 and the segments thereof are designated 227*a*, to 227*j*. The control element connected in series with current path 222 is in general designated control element 228 and the segments thereof are designated 228*a* to 228*j*. Current paths 211 and 212 of driver 20 respectively have control elements 217 and 218 connected in series therewith and Naturally, as in the first embodiment of the invention in order to propagate a signal from driver 20 to receiver 22 in the shortest possible time, the parameters of the circuitry must be such that the time delay introduced by each loop circuit is substantially equal. The time delay introduced by each loop circuit is substantially equal if each of the terms in the previously given expression is substantially equal to "*e*." The terms of the previously given expression can be easily calculated from the following table where the various parameters of the circuit are tabulated.

| | | | |
|---|---|---|---|
| $\frac{m_1}{3}$ | $\frac{W_{c2}}{1}$ | $\frac{m_2}{10}$ | $\frac{W_{c3}}{1}$ |
| $\frac{1}{R_0}$ | $\frac{1}{W_{c1}}$ | $\frac{3}{m_1}$ | $\frac{1}{W_{c1}}$ |

It should be noted that the first term $$\frac{m_1W_{c2}}{R_0W_{c1}}$$

is equal to three and that the second term $$\frac{m_2W_{c3}}{m_1W_{c1}}$$

is equal to three and one third. That is, the terms are not exactly equal. Since each of the terms is not exactly equal to "*e*," a time delay introduced by each loop circuit is not exactly equal and a signal is not propagated from driver 20 to receive 22 in the absolutely shortest possible time. However, since the value of each of the terms in the expression is greater than two and less than three and one half (i.e., each term is substantially equal to "*e*") signals are still propagated from the input 20 to the receiver 22 in substantially the shortest possible time. If the value of each of the terms is not substantially equal to "*e*," the propagation time is increased appreciably. That is, when the value of each term is between two and three and one half the efficiency relative to the time of propagation is high; however, if the value of the terms is outside of these limits, the efficiency relative to the time of propagation deteriorates substantially.

It should be noted that the circuitry shown herein consists of cross-film cryotrons. In such circuitry the virtual power level of each loop circuit is given by the product of one half the resistance of one of the gating elements in the loop circuit times the square of the current applied to the loop circuit, that is, $RI^2$ where R is one half the resistance of one of the gating elements in the loop. If the cross-film cryotrons shown herein are replaced by in-line cryotrons the virtual power level of each loop circuit is equal to the product of one half the resistance of one of the gating elements in each loop circuit times the current applied to the loop circuit, that is, RI. Hence, if in-line instead of cross-film cryotrons are used, all the previous discussion applies, except that the virtual power level of the loops is calculated as RI instead of $RI^2$.

Figure 4:
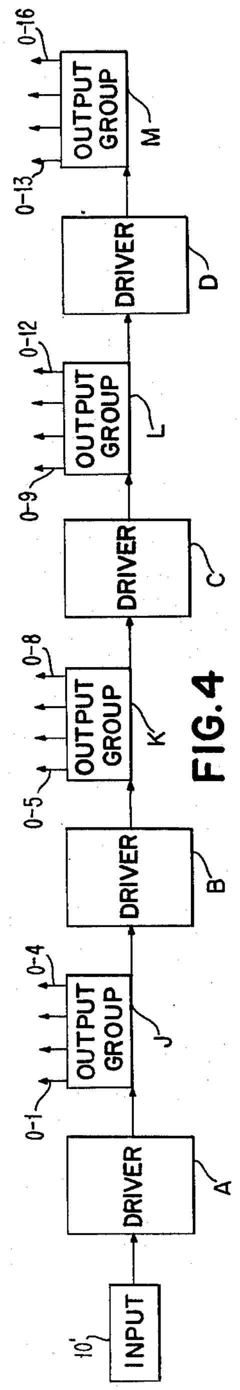
FIGURE 4 is a block diagram of a third preferred embodiment.
Figure 5:
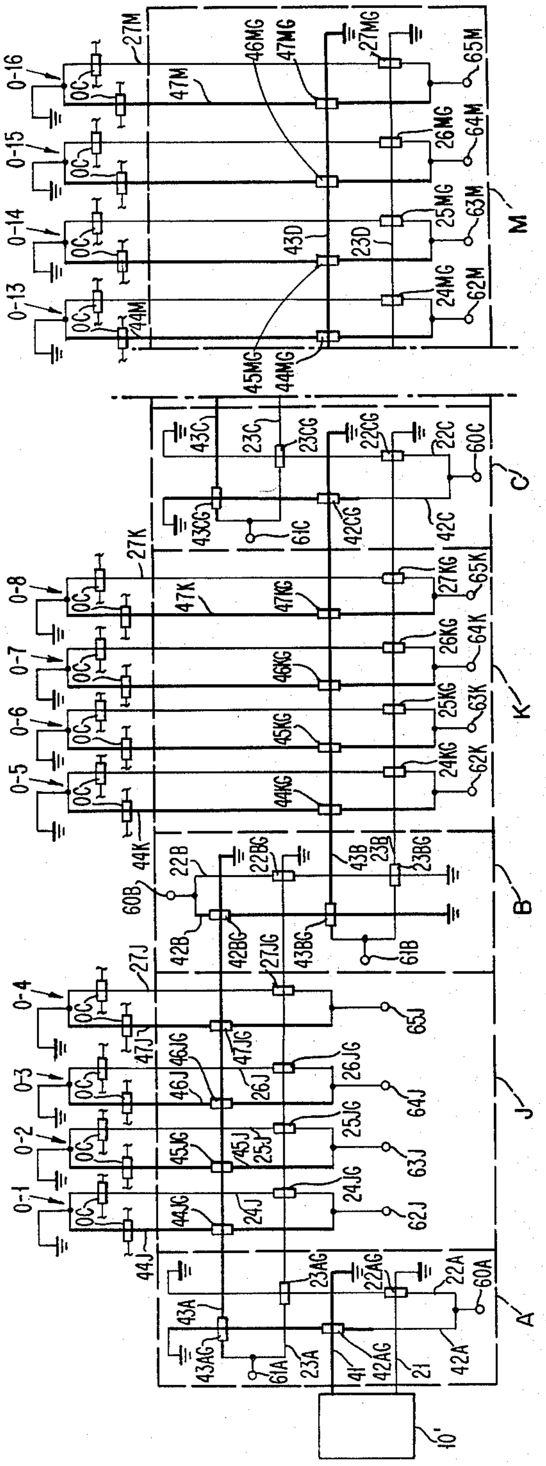
FIGURE 5 is a schematic circuit diagram of part of the circuitry shown in block form in FIGURE 4.
Figure 6:
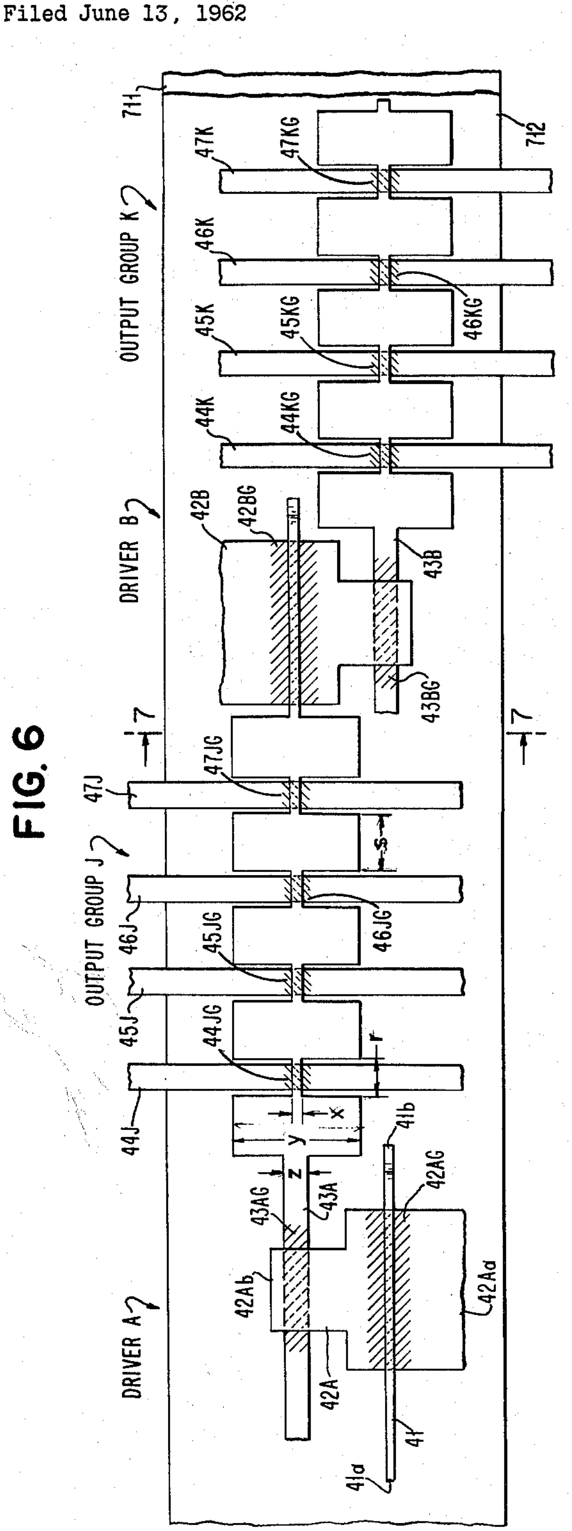
FIGURE 6 is a layout diagram of the physical structure of part of the circuitry shown in FIGURE 5.
Figure 7:
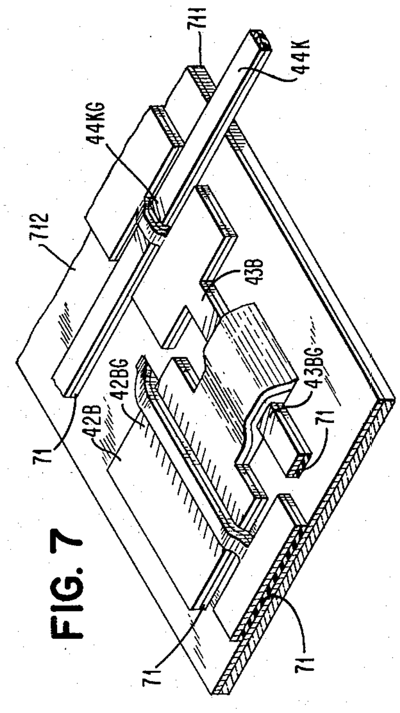
FIGURE 7 is a perspective view of part of the circuitry shown in FIGURE 6.

A third preferred embodiment of the invention is shown in FIGURES 4, 5, 6 and 7. As shown in block form in FIGURE 4 this embodiment includes an input 10', four drivers A to D, four output groups J to M and sixteen outputs O–1 to O–16. FIGURE 5 is an electrical schematic diagram of the circuitry. It should be noted that for ease of illustration and due to the repetitious nature the circuitry the details of output groups L and driver D are not shown in FIGURE 5. FIGURE 6 shows a physical layout of a representative portion of the circuitry and FIGURE 7 is a perspective view of the physical layout of a representative portion of the circuitry.

This embodiment includes nine cascaded loop circuits four of which have one impedance level and four of which have another impedance level; however, each of the loop circuits has the same virtual power level. Since each of the cascaded loop circuits has the same virtual power level, a signal is propagated from the first loop circuit to the last loop circuit with a minimum amount of delay.

In order to facilitate reference between the specification and the drawings each component in FIGURE 5 is designated by a numeral followed by a letter. Similar components which are located in different drivers or in different output groups are designated by the same numeral and the letter which follows the numeral designates the particular driver or the particular output group with which the particular component is associated. For example, driver A has a line designated 42A and the corresponding line in driver B is designated 42B.

The portion of the circuitry shown in FIGURE 5 in the bold lines designates the portion of the circuitry which is used to explain the physical structure of the device. The physical structure and layout of that portion of the circuitry in drivers A and B and output groups J and K which is shown in bold lines in FIGURE 5 is shown in FIGURE 6.

As shown in FIGURE 4 input 10' activates driver A which in turn activates output set J and driver B. Driver B activates output set K and driver C, etc. Input 10', each of the drivers A to D and each of the output sets J to M are formed by loop circuits. Each of the loop circuits has two current paths connected between a current source (designated in FIGURE 5 by a terminal) and a current collecting means (designated in FIGURE 5 by a ground symbol). Each current source constantly supplies a current (the magnitude of which will be explained later) and the circuitry operates so that there is current in one and only one of the current paths in any loop circuit at any particular time.

Each current path in each loop circuit has a reference numeral, and a loop circuit is designated by the numerals which designate the two paths of the loop circuit. For example, the loop circuit in driver A which includes current paths 22A and 42A is designated as loop circuit 22A–42A.

Driver A includes current paths 22A and 42A which are connected to a current source 60A to form loop circuit 22A–42A. Driver A also includes a part of current paths 21 and 41 which form loop circuit 21–41, and a part of current paths 23A and 43A which are connected to a current source 61A to form loop circuit 23A–43A. Current path 22A has a cryotron gating element 22AG connected in series therewith. The control line for cryotron gating element 22AG is connected in series with current path 21. Current path 42A has a cryotron gate element 42AG connected in series therewith. The control line for a cryotron gating element 42AG is connected in series with current path 41. Current paths 23A and 43A have cryotron gating elements 23AG and 43G respectively connected in series therewith. The control lines for cryotron gating elements 23AG and 43AG are respectively connected in series with current paths 22A and 42A.

Input 10' may be similar in structure to driver 10 shown in FIGURE 2*a*; however, the gating elements therein must be similar to gating element 43AG. Input 10' constantly supplies current to either current path 41 or to current path 21 and it supplies a signal to the circuit by changing current from current path 41 to current path 21 or vice versa. When the state of loop circuit 21–41 is changed, the state of loop circuit 22A–42A is changed through cryotron gate 22AG and 42AG and similarly when the state of loop circuit 22A–42A is changed the state of loop circuit 23A–43A is changed.

Output group J includes eight current paths 24J to 27J and 44J to 47J. Current paths 24J to 27J and 44J to 47J together with four current sources 62J to 65J form four output loops 24J–44J to 27J–47J, alternately designed O–1 to O–4. Output group J also includes a portion of current paths 23A and 43A and eight identical cryotron gating elements 24JG to 27JG and 44JG to 47JG which are respectively connected in series with current paths 24J to 27J and 44J to 47J.

Loop circuit 23A–43A controls the state of each of the output loop circuits 24S–44S to 27S–47S in the same manner that loop circuit 21–41 controls the state of loop circuit 22A–42A. The current paths in each of the output loops 24J–44J to 27J–47J (alternately designated outputs O–1 to O–4) control a plurality of output cryotrons designated OC. The output cryotrons OC are connected in utilization circuitry not shown herein.

Drivers B, C and D are each identical to previously described driver A, hence, no detailed description thereof will be given. It is noted that driver B is activated by loop circuit 23A–43A similar to the manner in which driver A was activated by loop circuit 21–41. Each of the other output groups K, L and M is identical to output group J. Herein for ease of illustration each loop circuit is shown connected between a separate current source and ground. Many of the separate current sources could be eliminated by connecting loop circuits in series as is known in the art.

The physical structure of selected representative portions of the circuitry is shown in FIGURES 6 and 7. The particular portions of drivers A and B and output sets J and K which are shown in FIGURES 6 and 7 are indicated in FIGURE 5 with bold lines. FIGURE 6 is a top view and FIGURE 7 is a perspective view of a portion of the circuit shown in FIGURE 6. For clarity of illustration no insulating material is shown in FIGURE 6; however, as shown in FIGURE 7 the various conductors are separated by layers of insulating material 71. The entire structure is mounted on a substrate 711. Directly above the substrate is a superconducting shield 712 which is used to reduce inductance and to serve as the return path for current as is conventional in the art. The use of a shield for these purposes is well known.

The portion of driver A shown in FIGURE 6 includes a portion of current paths 41, 42A and 43A. Current path 42A has a cryogenic gating element 42AG connected in series therewith and current path 43A includes cryogenic gating element 43AG connected in series therewith. Current path 41 which passes over and serves as the control element for gate element 42AG is connected to input 10′ (not shown in FIGURE 6) at point 41*a* and is connected to shield 12 at point 41*b*. Current path 42A which passes over and serves as a control element for gate element 43 is connected to current source 60A (not shown in FIGURE 4) at the end designated 42A*a* and it is connected to the shield 12 at the point designated 42A*b*. The shield 712 is therefore used as the return path for the current in the various conductors.

Similar to the manner in which the bold lines in FIGURE 5 indicate those portions of driver A which are shown in FIGURE 6, the bold lines in FIGURE 5 also indicate the portions of output group J which are shown in FIGURE 6. The portions of output group J which are shown in FIGURE 6 include portions of current paths 43A, 44J, 45J, 46J and 47J and cryotron gating elements 44JG, 45JG, 46JG and 47JG. FIGURE 6 also shows a portion of current path 42B and 43B and gating elements 42BG and 43BG which are part of a driver B and a portion of current paths 43B, 44K, 45K, 46K and 47K and gating elements 44KG, 45KG, 46KG and 47KG from output group K.

Similar to the previously described circuitry, in each current path the gating element in series with the current path is "3.2" times as wide as the control elements in series with the same current path. That is, the parameter $k$ has a value of "3.2." As previously stated the present invention is not limited to circuitry which has a value of $k$ equal to "3.2" and if the circuitry had a different value of $k$ the appropriate dimensions would merely be changed by a scale factor.

The portions of driver A and output group J not shown in FIGURE 6 are identical in construction to the portions shown, hence, no explanation thereof is given. Likewise each of the other drivers is identical in construction to driver A and each of the other output groups is identical in construction to output group J hence, no explanation thereof is given.

The width of each control element and of each gating element is driver A and in output group J is tabulated below. The dimensions are given in the previously explained system of units.

| Current path | Width of control elements connected in series therewith | Designation of gating element connected in series therewith | Width of gating element |
|---|---|---|---|
| 41 | 1.0 | Not shown. | |
| 42A | 10.0 | 42AG | 32.0 |
| 43A | 1.0 | 43AG | 3.2 |
| 44J | Not shown | 44JG | 3.2 |
| 45J | do | 45JG | 3.2 |
| 46J | do | 46JG | 3.2 |
| 47J | do | 47JG | 3.2 |

Current sources connected to current paths 41, 43A and 44J to 47J each supply one unit of current and the current source connected to current path 42A supplies ten units of current. It is noted that the current source for current path 41 is inside input 10′ and it is not explicitly shown.

The physical width of current path 43A differs along its length. The three different widths are designated $x$, $y$ and $z$. The length of each of the four control elements which control gating elements 44JG to 47JG is designated $r$ and the length of each segment which connects the control elements is designated $s$.

The reason that the dimensions of the circuitry are as shown is that the circuitry acts as a plurality of transmission lines and the impedance of the transmission lines must be properly related to the impedance of the drivers. Such circuitry is shown in U.S. Patent 2,962,681 entitled "Superconductor Circuits" by John J. Lentz which is assigned to the assignee of the present invention.

The actual dimensions depend upon the particular material used in structure. If each of the gating elements is made of an alloy material, such as that described in copending application by R. P. Reeber, Serial No. 814,495 entitled "Superconductive Components" (IBM Docket 10, 139) which is assigned to the assignee of the present invention, and if the thickness of insulation 71 is $10^{-5}$ cm., in order to properly relate the impedance of the current paths such as current path 43A to the resistance of the gating elements 43AG, the transmission line must have an impedance equal to approximately 0.09 ohm and the various lengths have the following values:

$x=5\times10^{-3}$ cm. $r=0.016$ cm.
$y=0.017$ cm. $s=0.144$ cm.
$z=16\times10^{-3}$ cm.

A pulse is propagated through the nine cascaded series of loop circuits from loop circuit 21–41 to loop circuit 23M–43M with a minimum amount of delay because the virtual power level of each of the loop circuits is the same. The virtual power level of each of the cascaded loop circuits is equal to TEN.

The nine cascaded loop circuits which have the same virtual power level are loop circuits (1) 21–41; (2) 22A–42A; (3) 23A–43A; (4) 22B–42B; (5) 23B–43B; (6) 22C–42C; (7) 23C–43C; (8) 22D–42D; (9) 23D–43D. Hence, signals are propagated through the above nine loops with a minimum amount of delay and the state of cryotrons 24JG to 27MG and 44JG to 47MG is changed with a minimum amount of delay. Loop circuits O–1 to O–16 have different virtual power levels and hence they do not change state with a minimum amount of delay; however, this is of little consequence because the added amount of delay from each of these loop circuits is not cumulative.

The virtual power level of the loop circuits in the drivers, i.e., loop circuits 22A–42A; 22B–42B; etc., is calculated as follows: The resistance of each gating element such as gating element 42AG is one-fifth unit (since the gating element is 32.0 units wide and the control element is one unit wide) and the current supplied to each of these loop circuits has a magnitude of ten units. Since the circuits are made of crossed film cryotrons, the virtual power level of a loop circuit is equal to the product of one-half the resistance of one of the gating elements times the square of the current supplied to the loop circuit. For loop circuits 22A–42A, 22B–42B, etc., that equals TEN. The virtual power level of the loop circuits in the output groups, i.e., loop circuits 23A–43A, 23B–43B, etc., is calculated as follows. The resistance of each gating element such as gating element 43AG is twenty units (since the gating element is 3.2 units wide and the control element is ten units wide) and the magnitude of the current supplied to each loop circuit is ONE. Since the virtual power level equals the product of one-half the resistance times the square of the current, it equals TEN.

It should be particularly noted that the virtual power level of the various loop circuits is equal even though the impedance level of the various loop circuits is not equal. That is, the chain of loop circuits shown is a minimum delay chain of loop circuits even though the loop circuits have different impedance levels.

Since the virtual power level of each of the loop circuits is equal, the time delay introduced by each of the loop circuits in the chain is equal. This can be easily seen from the following table from which it can be seen that the value of each of the ratios in the previously given expression is equal to TEN. As previously explained this shows that the time delay introduced by each of the loop circuits is equal.

| | | | |
|---|---|---|---|
| $\frac{m_1}{1}$ | $\frac{W_{c2}}{10}$ | $\frac{m_2}{1}$ | $\frac{W_{c3}}{1}$ |
| $\frac{10}{R_0}$ | $\frac{1}{W_{c1}}$ | $\frac{1}{m_1}$ | $\frac{1}{W_{c1}}$ |

where:

$R_0$ equals one-half the resistance of gating element 43AG.

$m_1$ equals the number of times current path 43A crosses gating element 42BG.

$m_2$ equals the number of times current path 42B crosses gating element 43BG.

$W_{c1}$ equals the width of the control element associated with gating element 42BG.

$W_{c2}$ equals the width of the control element associated with gating element 43BG.

$W_{c3}$ equals the width of each control element connected in series with current 43B.

The same ratio can be calculated for the other loop circuits with similar results.

Certain of the loop circuits could be eliminated from the current. For example, current path 41 could be directly used as a control element for gating element 43AG and current path 42A could be eliminated, in this instance, current path 41 would have to traverse gating element 43AG ten times in order to get the correct impedance level. Due to the shape of the masks needed, such a structure would be more difficult to fabricate than the structure shown herein.

The reason that a cascaded series of loop circuits is used instead of connecting current paths 21 and 41 directly in series with the control elements for cryotrons 24JG to 27JG, 44JG to 47JG, 24KG to 27KG, 44KG to 47KG, etc., is due to the terminal limitations on the input 10'. That is, with a cascaded series of loop circuits (i.e., with a subdivided line) the circuitry can operate at a higher repetition rate without exceeding the thermal limitations of the circuitry since each loop circuit only activates a relatively limited number of other loop circuits.

No specific definition for the time delay of a loop circuit has been given since the manner of defining time delay is not particularly relevant to the invention. The time delay introduced by a loop circuit may, for example, be defined as the time between when the gating element in the current path of a loop (i.e., the current path which is carrying current at a particular time) begins to become resistive and when sufficient current is shifted into the other current path of the loop circuit so that the control element in series therewith begins to make the associated gating element resistive.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A cryogenic network for interconnecting a driver circuit to a receiver circuit, said driver and said receiver each having a different virtual power level, said network comprising:

a plurality of cryogenic loop circuits cascaded in stages, each loop circuit having a current source, a current collecting means and two parallel current paths connecting said current source to said current collecting means, each current path having a gating element and a control element connected in series therewith, the number of stages interposed between said driver and said receiver being equal to the closest integer to the natural logarithm of the virtual power level of said receiver divided by the virtual power level of said driver.

2. A cryogenic network for interconnecting a driver loop circuit to a receiver loop circuit, said driver loop circuit and said receiver loop circuit having different virtual power levels, said interconnecting network having a plurality of cryogenic loop circuits cascaded in stages, the time delay of each of said cryogenic loop circuits being substantially equal, the number of stages interposed between said driver and said receiver being equal to the closest integer to the natural logarithm of the virtual power level of the receiver divided by the virtual power level of the driver.

3. A cryogenic network for interconnecting a driver circuit to a receiver circuit, said driver and said receiver having different virtual power levels, said network comprising:

a plurality of cryogenic loop circuits cascaded in stages, each loop circuit having a current source, a current collecting means and two parallel current paths connecting said current source to said current collecting means, each current path having a gating element and a control element connected in series therewith, the time delay of each of said loop circuits being substantially equal, the number of stages interposed between said driver and said receiver being equal to the closest integer to the natural logarithm of the virtual power level of said receiver divided by the virtual power level of said driver.

4. A network for connecting a driver to a receiver said driver and said receiver having different virtual power levels, said network comprising, a plurality of stages equal to the closest integer to the natural logarithm of the virtual power level of the receiver divided by the virtual power level of the driver, each of said stages comprising two cryotron gating elements controlled by two cryotron control elements, means connecting the cryotron control element in each stage in one loop circuit and the cryotron gating elements in each stage in a different loop circuit, each of said loop circuits comprising a current source, current collecting means, two current paths connecting said current source to said current collecting means, and each of said current paths including one said gating element and one said control element.

5. A cryogenic network for interconnecting a driver loop circuit to a receiver loop circuit, said driver loop circuit and said receiver loop circuit having different virtual power levels, said driver loop circuit and said receiver loop circuits having a current source, a current collecting means, two current paths interconnecting said current source and said current collecting means, each of said current paths including a cryogenic gating element and a control element, said gating element introducing two times $R_0$ units of resistance into the associated control path when said gating element is resistive, said network comprising a plurality of cryogenic loop circuits "1" to "$j$" cascaded in stages, each loop circuit having a current source, current collecting means and two parallel current paths connecting said current source to said current collecting means, each current path having a gating element and a control element connected in series therewith, said control element traversing the associated gating element $m_1$ to $m_j$ times respectively, said control element being $W_1$ to $W_j$ units wide respectively, the parameters of said loop circuits being such that each of the terms in the following expression is substantially equal:

$$\frac{m_1 W_{c2}}{R_0 W_{c1}} = \frac{m_2 W_{c3}}{m_1 W_{c2}} = \ldots = \frac{m_j W_{cr}}{m_{j-1} W_{cj-1}}$$

6. A cryogenic network for interconnecting a driver loop circuit to a receiver loop circuit, said driver loop circuit and said receiver loop circuit having different virtual power levels, said driver loop circuit and said receiver loop circuits having a current source, a current collecting means, two current paths interconnecting said current source and said current collecting means, each of said current paths including a cryogenic gating element and a control element, said gating element introducing two times $R_0$ units of resistance into the associated control path when said gating element is resistive, said network comprising a plurality of loop circuits "1" to "j" cascaded in stages, each loop circuit having a current source, current collecting means and two parallel current paths connecting said current source to said current collecting means, each current path having a cryogenic gating element and a control element connected in series therewith, said control element traversing the associated gating element $m_1$ to $m_j$ times, respectively, said control element being $W_1$ to $W_j$ units wide respectively, the parameters of said loop circuits being such that each of the terms in the following expression $$\frac{m_1 W_{c2}}{R_0 W_{c1}} = \frac{m_2 W_{c3}}{m_1 W_{c2}} = \ldots = \frac{m_j W_{cr}}{m_{j-1} W_{cj-1}}$$

is substantially equal, the number of stages interposed between said driver loop circuit and said receiver loop circuit being equal to the closest integer to the natural logarithm of the virtual power level of the receiver divided by the virtual power level of the driver.

7. A cryogenic network for interconnecting a driver loop circuit having a virtual power level of ONE to a receiver loop circuit having a virtual power level of EIGHTY-ONE, said network comprising;

a plurality of cryogenic loop circuits cascaded in four stages between said driver loop circuit and said receiver loop circuit, the time delay introduced by each of said loop circuits being substantially equal, whereby a signal is transmitted from said driver loop circuit to said receiver loop circuit in substantially the shortest possible time.

8. A cryogenic network for interconnecting a driver loop circuit having a virtual power level of ONE to a receiver loop circuit having a virtual power level of TEN, said network comprising;

a plurality of cryogenic loop circuits cascaded in two stages between said driver loop circuit and said receiver loop circuit, the time delay introduced by each of said cryogenic loop circuits being substantially equal, whereby a signal is transmitted from said driver loop circuit to said receiver loop circuit in substantially the shortest possible time.

9. First, second and third cascaded cryogenic loop circuits, each of said loop circuits comprising a current source, current collecting means, and two parallel paths connecting said current source to said current collecting means, each of said current paths including a cryogenic gating element and a control element, the gating element in said second loop circuit being divided into a plurality of sections and the control element in said first loop circuit being divided into a like plurality of sections, the plurality of sections of the control element in said first loop circuit being connected in series and the plurality of sections of the gating element in said second loop circuit being connected in series, the gating element in said third loop circuit being divided into a plurality of sections and the control element in said second loop circuit being divided into a like plurality of sections, said plurality of sections of the gating element in said third loop circuit being connected in series and the plurality of sections of the control element in said second loop circuit being connected in series, certain of the sections of the gating elements in the current paths of said second loop circuit being separated by sections of control element whereby in the current paths of said second loop circuit certain sections of gating element are separated from the remaining sections of gating element by sections of control element.

10. A cryogenic network for interconnecting a driver loop circuit having a virtual power level of ONE to a receiver loop circuit having a virtual power level of EIGHTY-ONE, said network including first, second and third cryogenic loop circuits cascaded in four stages between said driver loop and said receiver loop, each loop circuit including a current source, current collecting means, two parallel paths connecting said current source to said current collecting means, each of said current paths including a gating element and a control element, the control elements in said driver loop circuit being one unit wide and crossing the gating element of said second loop circuit one time, the control elements in said first loop circuit being three units wide and crossing the gating elements in said second loop circuit one time, the control elements in said second loop circuit being three units wide and crossing the gating elements in said third loop circuit three times, the gating elements in said third loop circuit being three units wide and crossing the gating elements in said receiver loop circuit nine times, whereby a signal is propagated from the driver loop to the receiver loop in substantially the shortest possible time.

11. A composite transmission line for transmitting signals from an input to a plurality of outputs, said transmission line comprising a plurality of cascaded cryogenic loop circuits, each loop circuit in said transmission line having two current paths connected between a current source and a current collecting means, each of said current paths including a control element and a gating element connected in series therewith, a plurality of said loop circuits each actuating a plurality of said outputs, the virtual power level of each of said loop circuits being equal, whereby signals are transmitted from said input to each of said outputs with a minimum amount of delay.

12. A cryogenic circuit comprising, a plurality of cryogenic loop circuits cascaded between an input loop circuit and an output loop circuit, each of said cryogenic loop circuits having the same virtual power level, whereby a signal is propagated from said input loop circuit through each of said loop circuits to said output loop circuit in substantially a minimum amount of time.

13. A cryogenic circuit comprising a series of cascaded cryogenic loop circuits, each of said cryogenic loop circuits comprising a current source, current collecting means, two current paths connecting said current source to said current collecting means, each of said current paths including gating element and control elements, the control elements connected in series with the current paths of each loop circuit being associated with the gating elements connected in series with the current paths of the next loop circuit in the series, the virtual power level of each of said loop circuits being the same, whereby a signal is propagated from the first cryogenic loop circuit in the series to the last cryogenic loop circuit in the series with the minimum amount of delay.

14. A cryogenic circuit comprising a plurality of cryogenic loop circuits cascaded, in series, said loop circuits being divided into a plurality of different classes, each loop circuit in each class having the same impedance level, the loop circuits in each class having a different impedance level from the loop circuits in the other classes, each of said cryogenic loop circuits having the same virtual power level, whereby a signal is propagated through said series of loop circuits with a minimum amount of delay.

References Cited by the Examiner

UNITED STATES PATENTS

| | | | |
|---|---|---|---|
| 3,019,354 | 1/62 | Anderson et al. | 307—88.5 |
| 3,056,041 | 9/62 | Davies | 307—88.5 |

ARTHUR GAUSS, *Primary Examiner.*